(12) United States Patent
Chen

(10) Patent No.: US 8,902,310 B2
(45) Date of Patent: Dec. 2, 2014

(54) MONITORING CAMERA DEVICE WITH WIRELESS CONTROL

(75) Inventor: Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 351 days.

(21) Appl. No.: 13/559,565

(22) Filed: Jul. 26, 2012

(65) Prior Publication Data

US 2013/0258102 A1    Oct. 3, 2013

(30) Foreign Application Priority Data

Mar. 30, 2012    (CN) .......................... 2012 1 0089744

(51) Int. Cl.
*H04N 7/18*    (2006.01)
(52) U.S. Cl.
USPC ......................................................... 348/143

(58) Field of Classification Search
USPC ................. 348/143, 180, 187, 836, 838, 839
See application file for complete search history.

(56) References Cited

U.S. PATENT DOCUMENTS

| 5,627,616 A * | 5/1997 | Sergeant et al. ............... 396/427 |
| 7,916,009 B2 * | 3/2011 | Schofield et al. ............. 340/438 |
| 2010/0007733 A1 * | 1/2010 | Bachem et al. ................ 348/143 |
| 2013/0209079 A1 * | 8/2013 | Alexander et al. ............. 396/25 |

* cited by examiner

*Primary Examiner* — Paulos M Natnael
(74) *Attorney, Agent, or Firm* — Novak Druce Connolly Bove + Quigg LLP

(57) ABSTRACT

A monitoring camera device includes an exterior casing made of elastic material, an interior casing made of rigid material and attached to an inner surface of the exterior casing, and a number of camera assemblies received in the interior casing. The exterior casing is elastically deformed when pushed by a flat surface, such that the air between the exterior casing and the flat surface is drawn out of the exterior casing, thereby allowing the exterior casing to be firmly attached to the flat surface and the camera of each camera assembly.

12 Claims, 7 Drawing Sheets

MONITORING CAMERA DEVICE WITH WIRELESS CONTROL

BACKGROUND

1. Technical Field

The present disclosure relates to capturing devices, and particularly, to a monitoring camera device capable of being controlled wirelessly and a monitoring camera system having the monitoring camera device.

2. Description of Related Art

Monitoring camera devices are commonly used in many places. Since the monitoring camera devices are usually secured to a location by means of screws, it may be cumbersome and time consuming to mount or remove the monitoring camera device.

Therefore, what is needed is means to solve the problems described above.

BRIEF DESCRIPTION OF THE DRAWINGS

Many aspects of the embodiments can be better understood with references to the following drawings. The units in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
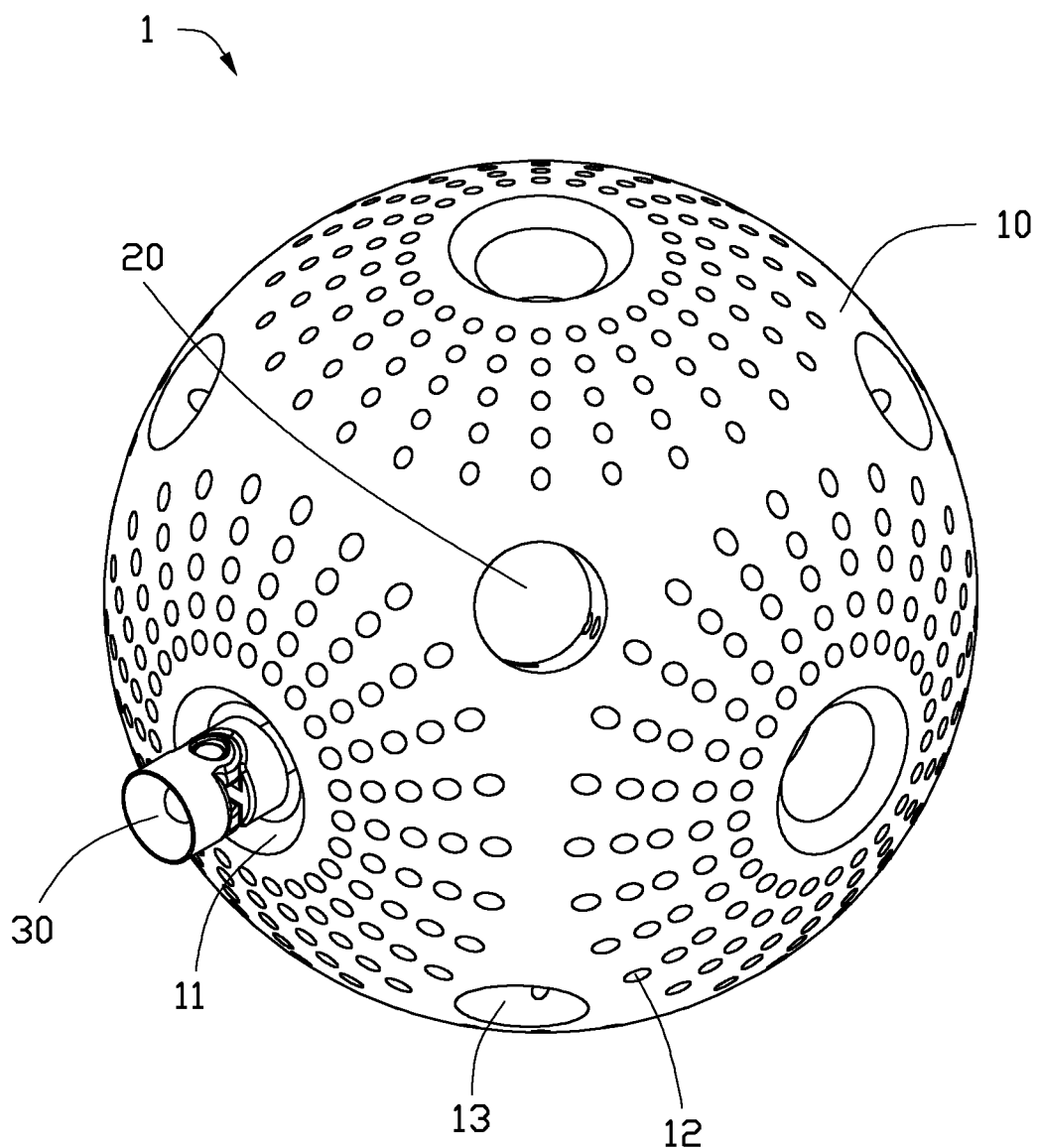
FIG. 1 is an isometric view of a monitoring camera device, in accordance with an exemplary embodiment.
Figure 2:
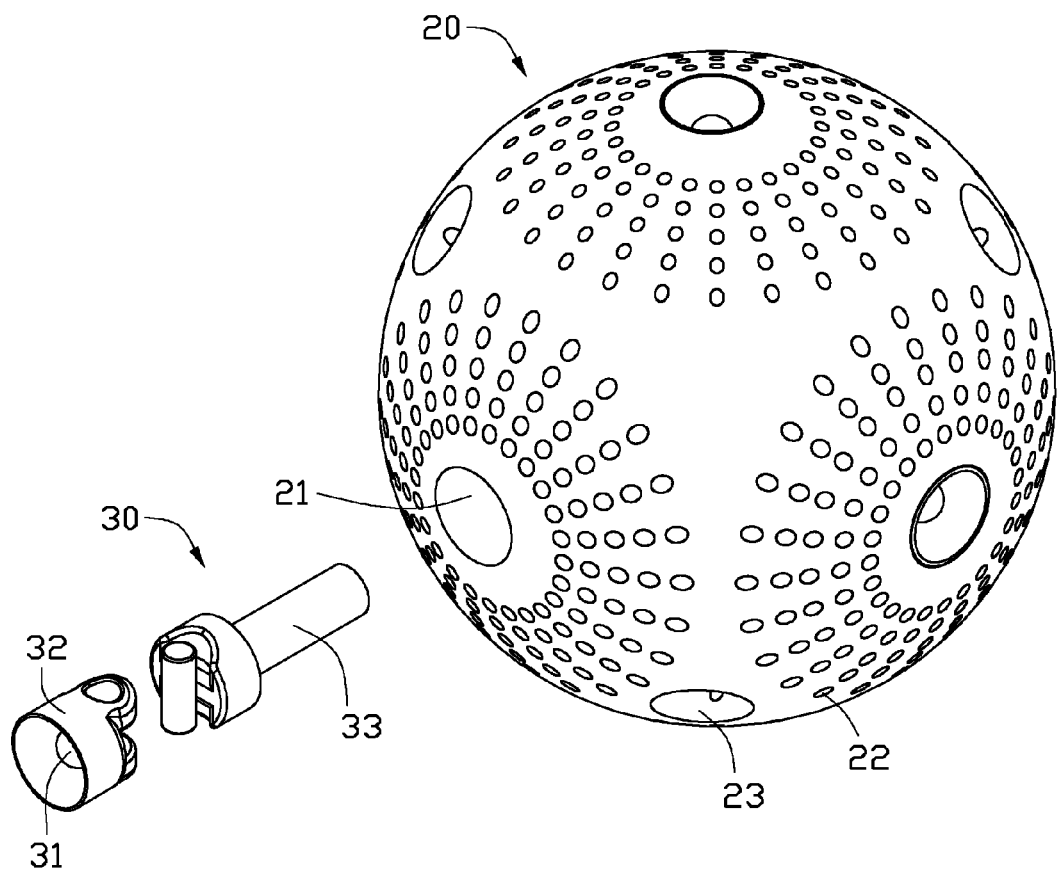
FIG. 2 is a partially disassembled isometric view of the monitoring camera device of FIG. 1.
Figure 3:
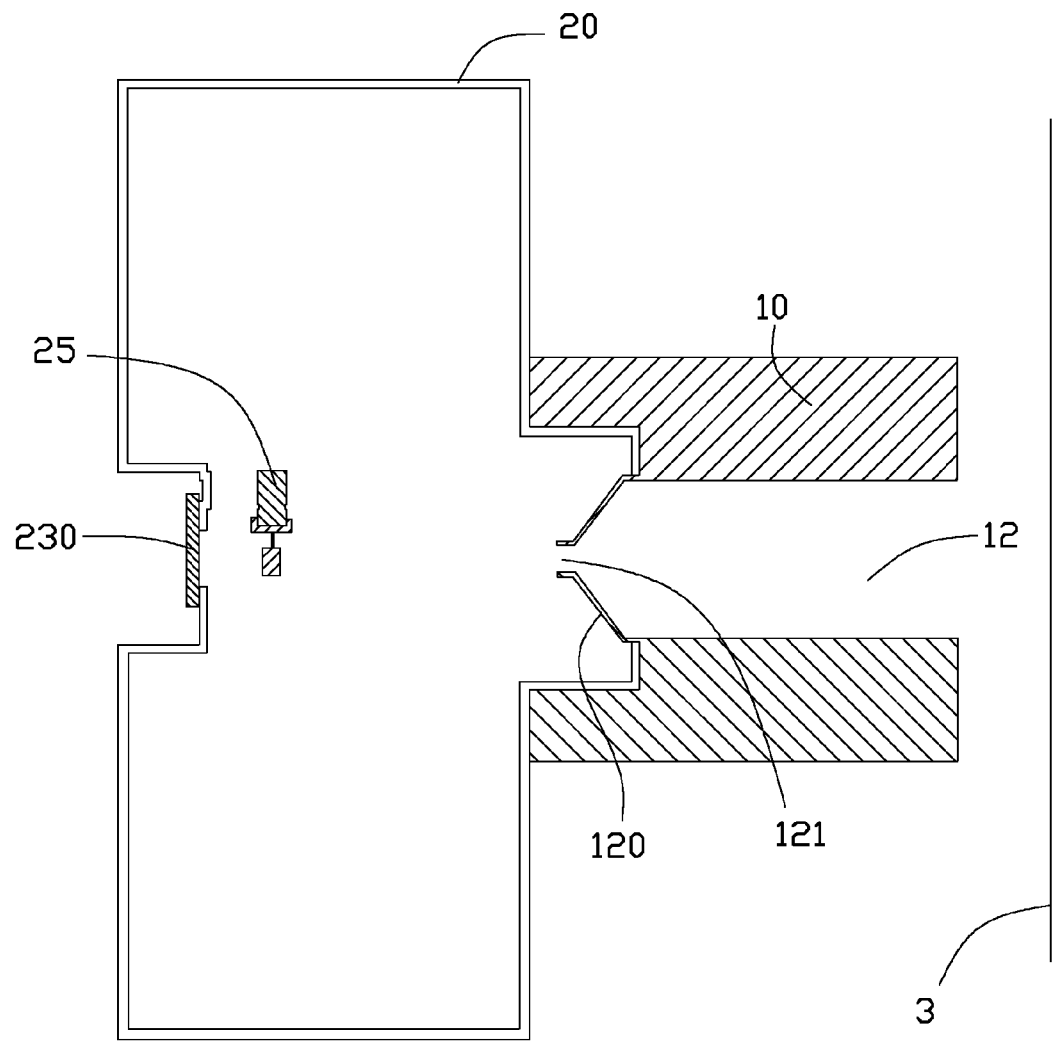
FIG. 3 is an enlarged sectional view of the monitoring camera device of FIG. 1.
Figure 4:
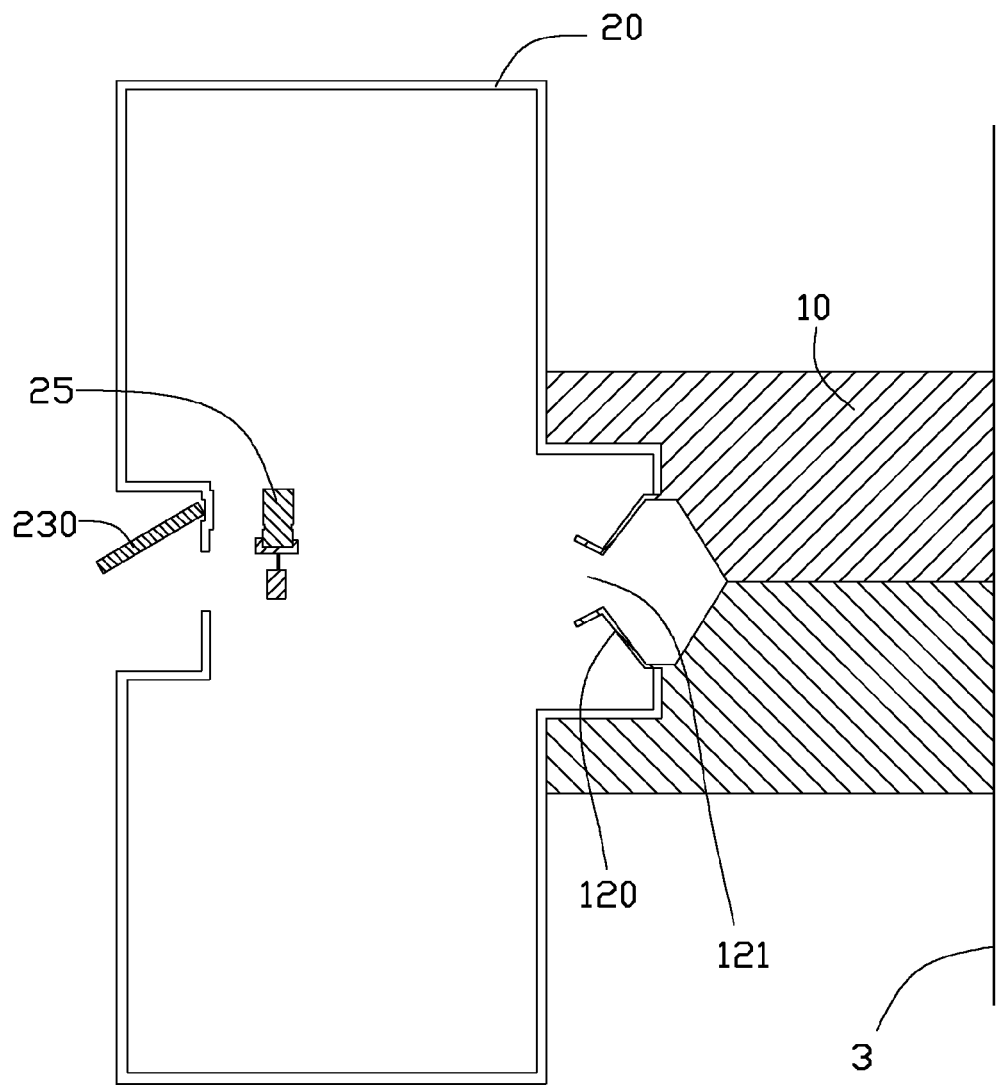
FIGS. 4-6 are similar to FIG. 3, but showing the monitoring camera device of different states.
Figure 5:
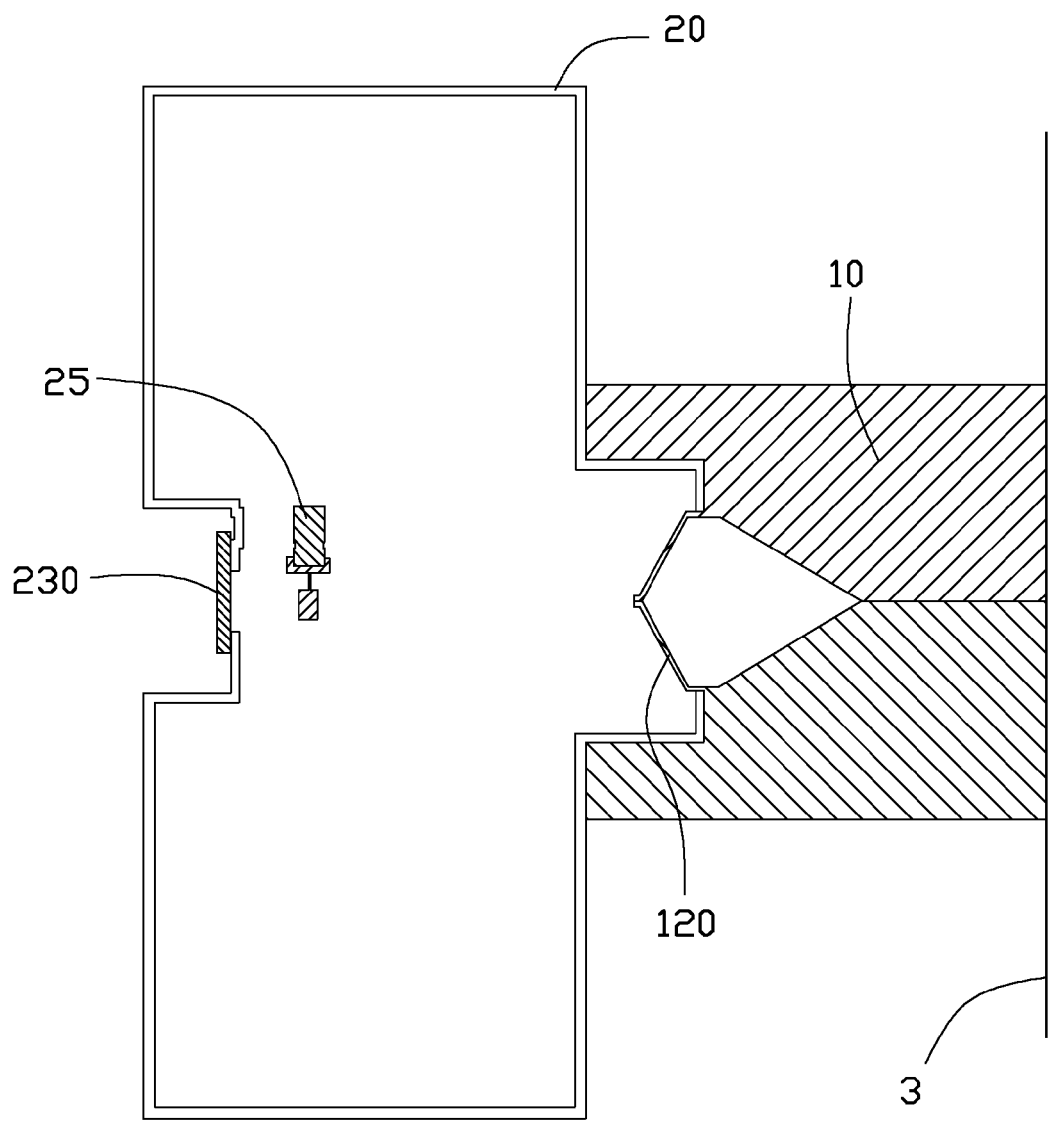
Figure 6:
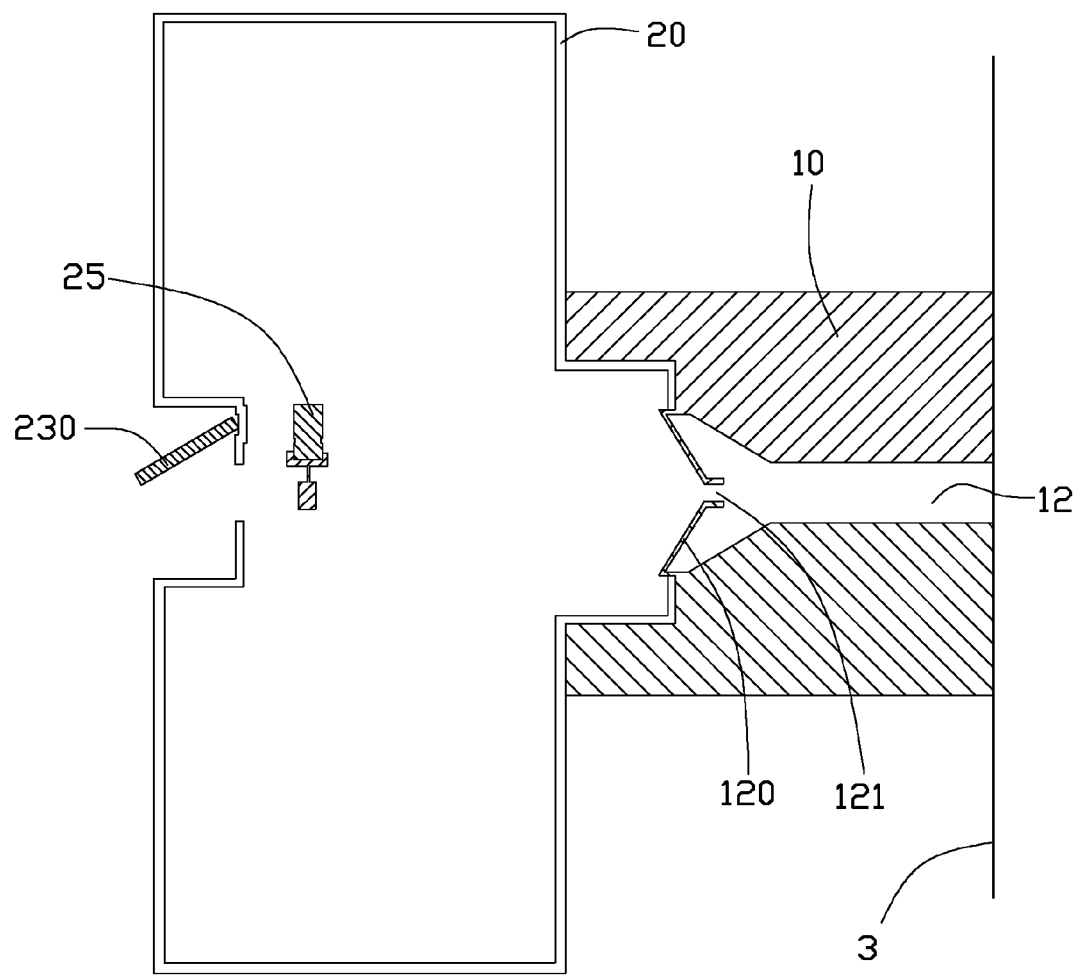

FIGS. 1-2 show an exemplary embodiment of a monitoring camera device 1. The monitoring camera device 1 includes an exterior casing 10, an interior casing 20 received in the exterior casing, and a number of camera assemblies 30 received in the interior casing 20. In one embodiment, each of the exterior and the interior casings 10, 20 is a hollow, spherical structure.

The exterior casing 10 is made of elastic material, such as rubber, and is elastically deformed when pushed. The exterior casing 10 defines a number of first receiving cavities 11, first vents 12, and first through holes 13. FIGS. 3-6, also show each of the first vents 12 includes an annular, elastic tap 120 protruding from the inner rim of the first vent 12, and the annular elastic tap 120 can be elastically deformed. Each annular elastic tap 120 defines an opening 121 in its center. When the exterior casing 10 is not elastically deformed, the corresponding annular elastic tap 120 is in its original state, and the corresponding opening 121 is in an open state (see FIG. 3). When the exterior casing 10 is elastically deformed to allow the air in the first vents 12 to flow, the annular elastic tap 120 is elastically deformed, and the opening 121 can be enlarged or closed (see FIGS. 4-6).

The interior casing 20 is made of rigid material and is attached firmly to the inner surface of the exterior casing 10. The interior casing 20 defines a number of second receiving cavities 21, second vents 22, and through holes 23. The second receiving cavities 21 are aligned with the first receiving cavities 11, the second vents 22 are aligned with the first vents 12, and the second through holes 23 are aligned with the first through holes 13. In the embodiment, the second receiving cavities 21 are respectively communicating with the corresponding first receiving cavities 11, and the imaginary central axis of each first and the corresponding second receiving cavities 11, 12 passes through the spherical center of the exterior casing 10. Similarly, the second vents 22 are respectively communicating with the corresponding first vents 12. The imaginary central axis of each first and the corresponding second vents 12, 22 passes through the spherical center of the exterior casing 10. The second through holes 23 are respectively communicating with the corresponding first through holes 13, and the imaginary central axis of each first and the corresponding second through holes 13, 23 passes through the spherical center of the exterior casing 10. A number of valve members 230 are rotatably connected to the interior casing 20 adjacent to the corresponding second through holes 23. When pushed by the flowing air in the interior casing 20, the valve members 230 can be rotated with respect to the corresponding second through holes 23, thereby covering or exposing the second through holes 23.

When a user pushes the exterior casing 10 against a flat surface 3 (i.e., a surface of a wall), at least part of the exterior casing 10 is elastically deformed. FIGS. 3-6 only schematically show one first vent 12 of the part of the exterior casing 10 and one second vent 12 of the interior casing 20 for the sake of simplicity. The air between the exterior casing 10 and the flat surface 3 is drawn into the interior casing 20 through the first vent 12, and then the deformed exterior casing 10 causes the first vent 12 to be closed, such that a vacuum state is formed between the exterior casing 10 and the flat surface 3. Moreover, when pushed by the flowing air, the annular elastic tap 120 is elastically deformed, causing the opening 121 to be enlarged, and the valve member 230 to rotate away from the second through hole 23 to expose the second through hole 23. Thus the flowing air in the interior casing 20 can be drawn out of the exterior casing 10 via the first and the second through holes 13, 23 (see FIG. 4).

The deformed exterior casing 10 further provides a resilient force to allow the exterior casing 10 to partly rebound, thus the air in the interior casing 20 is drawn toward the annular elastic tap 120. Then the annular elastic tap 120 is elastically deformed again and covers the opening 121, and the valve member 230 is rotated toward the second through hole 23 to cover the second through hole 23. The closed annular elastic tap 120 and valve member 230 can prevent the air outside the exterior casing 10 from being drawn into the space between the exterior casing 10 and the flat surface 3, thereby maintaining the generated vacuum state between the exterior casing 10 and the flat surface 3 (see FIG. 5). Therefore, the monitoring camera device 1 can be firmly attached to the flat surface 3 when the user pushes the monitoring camera device 1 to the flat surface 3.

Furthermore, the image capturing device 1 can be removed from the flat surface 3 when the vacuum state between the exterior casing 10 and the flat surface 3 disappears. In one embodiment, the interior casing 20 further includes a first driving unit 24 (e.g., a motor) and a discharging unit 25 (e.g., a fan) connected to the first driving unit 24. The first driving unit 24 and the discharging unit 25 are received in the interior casing 10. The discharging unit 25 can be rotated when driven by the first driving unit 24, such that the air in the interior casing 10 is flowing again. Therefore, the annular elastic tap 120 is pushed by the flowing air and is elastically deformed again, which exposes the opening 121, and the valve member 230 is rotated away from the second through hole 23 to expose the second through hole 23. Then, the air outside the exterior casing 10 can be drawn into the space between the exterior casing 10 and the flat surface 3 through the second through hole 23 and the opening 121. Thus the vacuum state between the exterior casing 10 and the flat surface 3 disappears and then the monitoring camera device 1 can be removed from the flat surface 3 (see FIGS. 6-7).

In an alternative embodiment, the first driving unit 24 and the discharging unit 25 may be omitted. In this case, the users only need to pull the monitoring camera device 1 away from the flat surface 3 to force the air to be drawn into the space between the exterior casing 10 and the flat surface 3, thereby causing the vacuum state to disappear.

Figure 7:
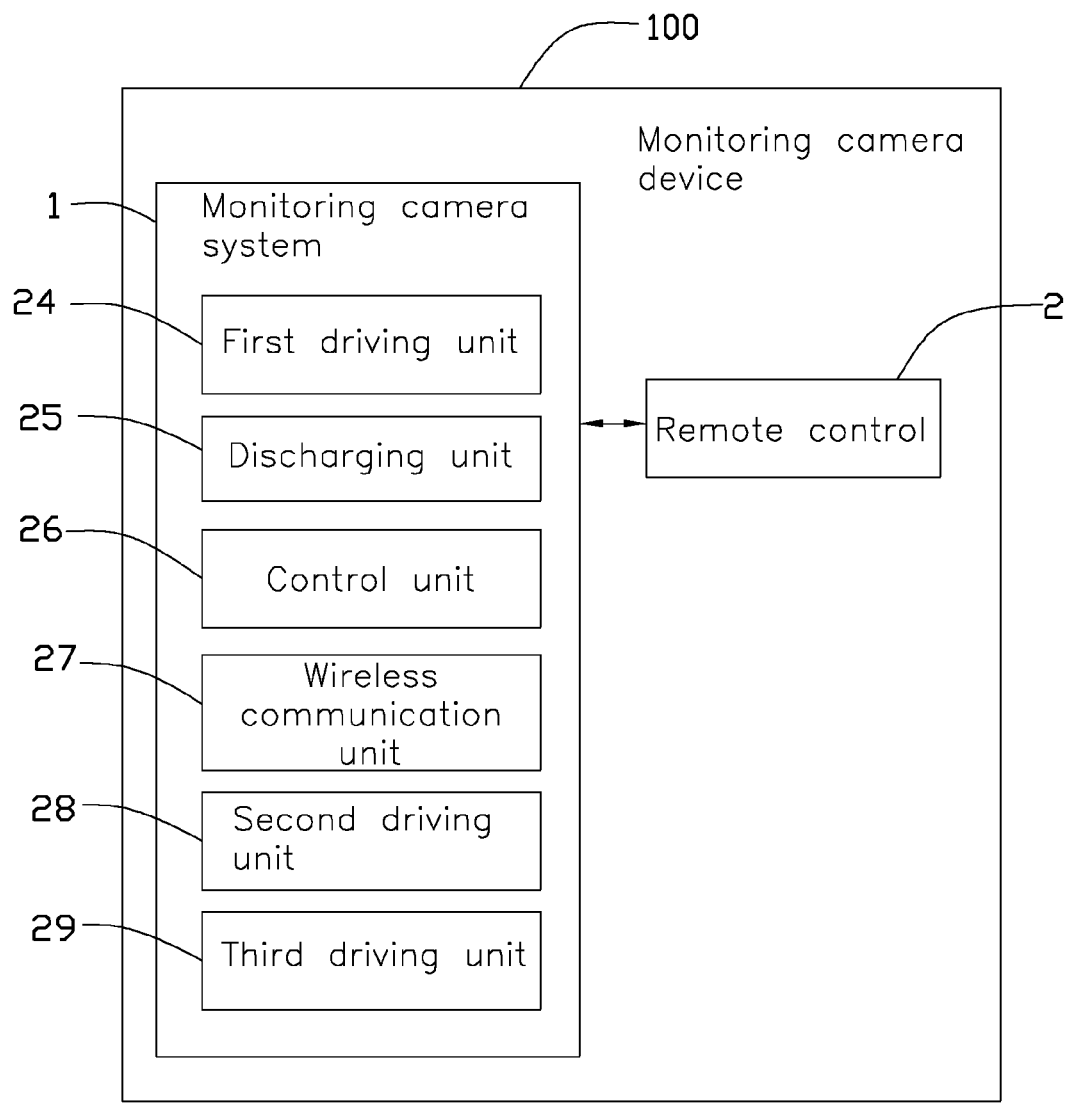
FIG. 7 is a block diagram of the monitoring camera device of FIG. 1 included in a monitoring camera system.

FIG. 7 is a block diagram of the monitoring camera device 1, in accordance with an exemplary embodiment. In one embodiment, the monitoring camera device 1 is applied in a monitoring camera system 100, and the monitoring camera system 100 further includes a remote control 2. The users can use the remote control 2 to control the discharging unit 25 to rotate. When the corresponding button of the remote control 2 is pressed, the remote control device 2 generates an instruction signal in response, and then transmits the instruction signal wirelessly to the monitoring camera device 1. The monitoring camera device 1 further includes a control unit 26 and a wireless communication unit 27 received in the interior casing 20. After receiving the instruction signal via the wireless communication unit 27, the control unit 26 controls the first driving unit 24 to operate, thus the discharging unit 25 is driven to rotate.

Each camera assembly includes a camera 31, and each camera 31 is facing the corresponding first and second receiving cavities 21. When the monitoring camera device 1 is attached to the flat surface 3, the users can press the corresponding button of the remote control device 2 to control at least one camera 31 to capture images of objects outside the exterior casing 10 through the corresponding first and the second receiving cavities 11, 21.

In one embodiment, the number of the camera assemblies 30 is six. In this case, the exterior casing 10 defines six first receiving cavities 11 facing the corresponding camera assemblies 30, and the six first receiving cavities 11 are respectively arranged on the top, the bottom, the front, the back, the left and the right of the exterior casing 10. The interior casing 20 defines six second receiving cavities 21 facing the corresponding first receiving cavities 11, and the six second receiving cavities 21 are respectively arranged corresponding to the six first receiving cavities 11.

In one embodiment, the interior casing 20 further includes a second driving unit 28 connected to the camera assemblies 30. Each camera assembly 30 can be moved along the radial direction of the interior casing 20 when driven by the second driving unit 28, thus the camera assembly 30 can move in the first and the second receiving cavities 11, 21. In this case, the first and the second receiving cavities 11, 21 are wider than the camera 31. Similarly, the users can press the corresponding button of the remote control device 2 to control the second driving unit 24 to operate, thus the camera assemblies 30 is driven to move.

In the embodiment, each camera assembly 30 further includes a support base 32 for securing the camera 31 and a shaft portion 33 rotatably connected to the support base 32 as shown in FIG. 2. The interior casing 20 further includes a third driving unit 29 received in the interior casing 20 and connected to the support base 32. After moving out of the first receiving cavities 11, the camera 31 can be rotated together with the support base 32 about the shaft portion 33 when driven by the third driving unit 29, thus the shooting range of the camera 31 is allowed to be adjusted. Similarly, the users can press the corresponding button of the remote control 2 to control the third driving unit 29 to operate, thus the camera 31 is driven to rotate.

In one embodiment, each second receiving cavity 21 further includes an elastic sheet (not shown). The elastic sheet is elastically deformed when the camera assembly 30 is moved along the radial direction of the exterior casing 10 to fill the space between the camera assembly 30 and the second receiving cavities 21. Thereby preventing the air outside the exterior casing 10 from being drawn into the interior casing 20 through the space and then maintaining the vacuum state between the exterior casing 10 and the flat surface 3.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A monitoring camera device, comprising:
an exterior casing made of elastic material, defining a plurality of first receiving cavities, first vents, and first through holes; each of the first vents comprising an annular, elastic tap protruding from an inner rim of the first vent, each annular elastic tap being capable of being elastically deformed and defining an opening, wherein when the exterior casing is not elastically deformed, the corresponding annular elastic tap is in an original state, and the corresponding opening is in an open state; when the exterior casing is elastically deformed to allow air to flow in the first vents, the annular elastic tap is elastically deformed, and the opening is enlarged or closed;
an interior casing made of rigid material, attached to an inner surface of the exterior casing, and defining a plurality of second receiving cavities aligned with the first receiving cavities, second vents aligned with the first vents, and second through holes aligned with the first through holes, a plurality of valve members being rotatably connected to the interior casing adjacent to the corresponding second through holes, wherein when pushed by the air flowing in the interior casing, the valve members are able to rotate with respect to the corresponding second through holes, thereby covering or exposing the second through holes; and
a plurality of camera assemblies received in the first receiving cavities and the second receiving cavities, each camera assembly comprising a camera.

2. The monitoring camera device of claim 1, wherein each of the exterior and the interior casings is a hollow, spherical structure.

3. The monitoring camera device of claim 2, wherein the second receiving cavities are respectively communicating with the corresponding first receiving cavities, and an imaginary central axis of each first and the corresponding second receiving cavities passes through a spherical center of the exterior casing; the second vents are respectively communicating with the corresponding first vents, and an imaginary central axis of each first and the corresponding second vents passes through the spherical center of the exterior casing; the second through holes are respectively communicating with the corresponding first through holes, and an imaginary central axis of each first and the corresponding second through holes passes through the spherical center of the exterior casing.

4. The monitoring camera device of claim 1, wherein the number of the plurality of camera assemblies is six; the number of the plurality of first and second receiving cavities is six; the six first receiving cavities are respectively arranged on a bottom, a top, a front, a back, a left and a right directions of the exterior casing; and the six second receiving cavities are respectively arranged corresponding to the six first receiving cavities.

5. The monitoring camera device of claim 1, wherein the interior casing further comprises a first driving unit and a discharging unit connected to the first driving unit; the discharging unit is able to be rotated when driven by the first driving unit to allow the air in the interior casing to flow, thus the annular elastic taps are pushed by the flowing air and then elastically deformed to expose the openings, and the valve members are rotated away from the second through holes to expose the second through holes.

6. The monitoring camera device of claim 5, wherein the interior casing further comprises a control unit and a wireless communication unit, when receiving an instruction signal via the wireless communication unit, the control unit controls the first driving unit to operate, thus the discharging unit is driven to rotate.

7. The monitoring camera device of claim 1, wherein the interior casing further comprises a second driving unit connected to the camera assemblies, and each camera assembly is able to be moved along a corresponding radial direction of the interior casing when driven by the second driving unit, thus the camera assemblies are able to move in the first and the second receiving cavities.

8. The monitoring camera device of claim 7, wherein the interior casing further comprises a control unit and a wireless communication unit, when receiving an instruction signal via the wireless communication unit, the control unit controls the second driving unit to operate, thus the camera assemblies are driven to move in the first and the second receiving cavities.

9. The monitoring camera device of claim 7, wherein each second receiving cavity further comprises an elastic sheet, and the elastic sheet is elastically deformed when the camera assembly is moved along the radial direction of the exterior casing to fill the space between the camera assembly and the second receiving cavities, thereby preventing the air outside the exterior casing from being drawn into the interior casing through the space.

10. The monitoring camera device of claim 1, wherein each camera assembly further comprises a support base for securing the camera and a shaft portion rotatably connected to the support base; the interior casing further comprises a third driving unit connected to the support base; and the camera is able to be rotated together with the support base about the shaft portion when driven by the third driving unit after moving out of the first and the second receiving cavities, thus a shooting range of the camera is allowed to be adjusted.

11. The monitoring camera device of claim 10, wherein the interior casing further comprises a control unit and a wireless communication unit, when receiving an instruction signal via the wireless communication unit, the control unit controls the third driving unit to operate, thus the camera is driven to rotate together with the support base.

12. A monitoring camera system comprising:
   a monitoring camera device, comprising:
      an exterior casing made of elastic material, defining a plurality of first receiving cavities, first vents, and first through holes, each of the first vents comprising an annular, elastic tap protruding from an inner rim of the first vent, each annular elastic tap being capable of being elastically deformed and defining an opening, wherein when the exterior casing is not elastically deformed, the corresponding annular elastic tap is in an original state, and the corresponding opening is in an open state; when the exterior casing is elastically deformed to allow air to flow in the first vents, the annular elastic tap is elastically deformed, and the opening is enlarged or closed;
      an interior casing made of rigid material, attached to an inner surface of the exterior casing, and defining a plurality of second receiving cavities aligned with the first receiving cavities, second vents aligned with the first vents, and second through holes aligned with the first through holes, a plurality of valve members being rotatably connected to the interior casing adjacent to the corresponding second through holes, wherein when pushed by the air flowing in the interior casing, the valve members is able to rotate with respect to the corresponding second through holes, thereby covering or exposing the second through holes; and
      a plurality of camera assemblies received in the first receiving cavities and the second receiving cavities, each camera assembly comprising a camera; and
   a remote control to generate an instruction signal when a corresponding button of the remote control is pressed, and transmit the instruction signal to the monitoring camera device to direct the camera assemblies to take certain actions.

* * * * *